(12) United States Patent
Takayama et al.

(10) Patent No.: US 10,280,115 B2
(45) Date of Patent: May 7, 2019

(54) FLUIDIZED CALCINER

(71) Applicant: MITSUBISHI MATERIALS CORPORATION, Chiyoda-ku (JP)

(72) Inventors: Yoshinori Takayama, Naka (JP); Junzhu Wang, Naka (JP)

(73) Assignee: MITSUBISHI MATERIALS CORPORATION, Chiyoda-ku (JP)

( * ) Notice: Subject to any disclaimer, the term of this patent is extended or adjusted under 35 U.S.C. 154(b) by 394 days.

(21) Appl. No.: 14/441,353

(22) PCT Filed: Dec. 25, 2013

(86) PCT No.: PCT/JP2013/007585
§ 371 (c)(1),
(2) Date: May 7, 2015

(87) PCT Pub. No.: WO2014/103302
PCT Pub. Date: Jul. 3, 2014

(65) Prior Publication Data
US 2015/0307396 A1    Oct. 29, 2015

(30) Foreign Application Priority Data

Dec. 26, 2012  (JP) .................................. 2012-282646
Dec. 17, 2013  (JP) .................................. 2013-260301

(51) Int. Cl.
*C04B 7/45*      (2006.01)
*F27B 15/14*    (2006.01)
(Continued)

(52) U.S. Cl.
CPC ................ *C04B 7/45* (2013.01); *C04B 7/434* (2013.01); *F27B 15/10* (2013.01); *F27B 15/14* (2013.01)

(58) Field of Classification Search
CPC .......... F27B 15/14; F27B 15/10; F27B 15/02; F27B 7/2033; C04B 7/45; C04B 7/434; C21D 1/53
See application file for complete search history.

(56) References Cited

U.S. PATENT DOCUMENTS 3,449,062 A * 6/1969 Maurer .................... C21D 1/53
                                                                  423/351
3,910,754 A * 10/1975 Weber .................. F27B 7/2033
                                                                  34/371
(Continued)

FOREIGN PATENT DOCUMENTS

CN         202532880 U      11/2012
CN         202543077 U      11/2012
(Continued)

OTHER PUBLICATIONS

International Search Report dated Mar. 25, 2014 in PCT/JP2013/007585 Filed Dec. 25, 2013.
(Continued)

*Primary Examiner* — Steven B McAllister
*Assistant Examiner* — Steven S Anderson, II
(74) *Attorney, Agent, or Firm* — Oblon, McClelland, Maier & Neustadt, L.L.P.

(57) ABSTRACT

A fluidized calciner is provided which allows a reduction in the rate of unburned fuel at an outlet of a fluidized calciner to enable sufficient calcination while preventing possible occlusion in a preheater, even when pulverized coal of coal or coke, which has low combustion quality, is used as fuel, based on calculations in accordance with computational fluid dynamics based on the shape of an actual furnace and operational conditions. The present invention provides a fluidized calciner including a tubular furnace body (2) in which an axial direction is an up-down direction, a pulverized coal blowing line (3) through which fuel is blown into (Continued)

the furnace body (2), a raw material chute (4) through which a cement raw material is loaded into the furnace body (2), at least one air introduction pipe (5) through which introduced air is sucked, the pulverized coal blowing line (3), the raw material chute (4), and the air introduction pipe (5) being connected to a side portion of the furnace body (2), and a fluidizing air blowing port (6) disposed at a bottom portion of the furnace body (2) and through which fluidizing air is blown into the furnace body (2), in which a blowing port of the pulverized coal blowing line (3) is disposed below a suction port of the air introduction pipe (5) and above the fluidizing air blowing port (6).

3 Claims, 6 Drawing Sheets

(51) Int. Cl.
*F27B 15/10* (2006.01)
*C04B 7/43* (2006.01)

(56) References Cited

U.S. PATENT DOCUMENTS

| | | | | |
|---|---|---|---|---|
| 3,925,024 A | * | 12/1975 | Hollingsworth | B01J 8/44 165/104.16 |
| 4,025,295 A | * | 5/1977 | Touborg | C04B 2/12 34/576 |
| 4,372,784 A | * | 2/1983 | Hess | F27B 7/2033 106/759 |
| 4,877,397 A | | 10/1989 | Tatebayashi et al. | |
| 4,993,332 A | * | 2/1991 | Boross | F23C 1/00 110/204 |
| 5,044,942 A | * | 9/1991 | Chatwani | F27B 15/02 432/100 |
| 5,788,482 A | | 8/1998 | Hashimoto et al. | |
| 5,944,513 A | * | 8/1999 | Yokota | F27B 7/2025 432/106 |
| 2004/0131538 A1 | | 7/2004 | Ohzeki | |
| 2007/0163476 A1 | * | 7/2007 | Comrie | C10L 9/10 110/345 |
| 2012/0171633 A1 | | 7/2012 | Shima et al. | |

FOREIGN PATENT DOCUMENTS

| | | |
|---|---|---|
| EP | 0 240 304 A2 | 10/1987 |
| JP | 60 112651 | 6/1985 |
| JP | 60112651 A * | 6/1985 |
| JP | 8 231254 | 9/1996 |
| JP | 08231254 A * | 9/1996 |
| JP | 2004 124133 | 4/2004 |
| JP | 2011 105536 | 6/2011 |
| WO | WO 01/73343 A1 | 10/2001 |

OTHER PUBLICATIONS

Search Report dated Oct. 20, 2016 in Taiwanese Patent Application No. 102147977 (with English translation of categories of cited documents).

Supplementary European Search Report dated Sep. 8, 2016 in Patent Application No. 13 867 691.1.

\* cited by examiner

⟹ PULVERIZED COAL LOADING DIRECTION
⟹ RAW MATERIAL LOADING DIRECTION

⟹ PULVERIZED COAL LOADING DIRECTION
⟹ RAW MATERIAL LOADING DIRECTION

⟹ PULVERIZED COAL LOADING DIRECTION
⟹ RAW MATERIAL LOADING DIRECTION

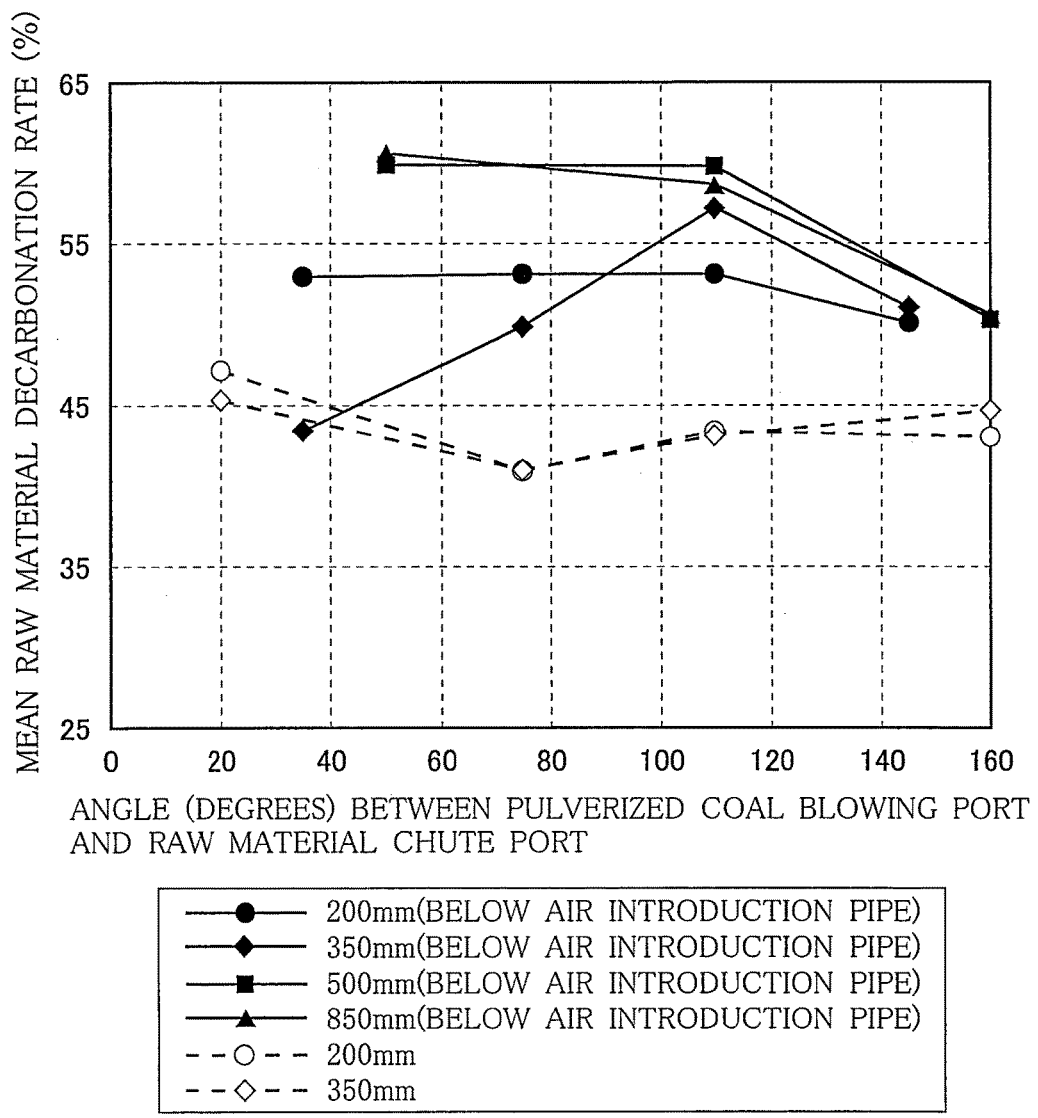

DISTRIBUTION OF TEMPERATURE IN FURNACE IN WHICH PULVERIZED COAL LINE IS ARRANGED AT POSITION OTHER THAN POSITION BELOW AIR INTRODUCTION PIPE

DISTRIBUTION OF TEMPERATURE IN FURNACE IN WHICH PULVERIZED COAL LINE IS ARRANGED BELOW AIR INTRODUCTION PIPE

FLUIDIZED CALCINER

TECHNICAL FIELD

The present invention relates to a fluidized calciner that enables the rate of unburned fuel at an outlet of a calciner to be reduced by optimizing a supply position for pulverized coal.

BACKGROUND ART

Conventionally, in a cement manufacturing facility 10 with a fluidized calciner, a raw material heated by heat exchange with hot gas in a suspension preheater 7 is discharged from a lower-stage cyclone 8 of the suspension preheater 7, and a portion of the raw material is dispersively loaded into a rotary kiln exhaust gas duct 9, with the remaining portion of the raw material supplied to a raw material supply chute 12 of a fluidized calciner 11 as depicted in FIG. 6.

In the fluidized calciner 11, high-pressure air is blown in through a fluidization air blowing port 13, an air chamber 13a, and an air dispersing plate 14 to form a fluidizing bed 15. At this time, the high-pressure air causes combustion of a portion of fuel supplied through a pulverized supply pipe 16, makes a calcination target raw material stagnant in the fluidizing bed 15 for a predetermined time, and then causes the raw material to fly up to a free board 17 located above the fluidizing bed 15. Furthermore, air from a hot clinker cooler 18 is sucked through a suction port 19 substantially in a tangential direction, and the fuel supplied through the pulverized coal supply pipe 16 is also combusted in the free board 17. Thus, the raw material loaded through the upper raw material supply chute 12 and the raw material flying up from a surface of the fluidizing bed 15 are efficiently and quickly calcined.

Then, all of the calcined raw material is entrained by calciner exhaust gas and enters a separating cyclone 21. On the other hand, the raw material dispersively loaded into the rotary kiln exhaust gas duct 9 is also partly calcined by rotary kiln exhaust gas and enters the separating cyclone 21 along with the rotary kiln exhaust gas. Moreover, a calcination raw material collected by the separating cyclone 21 is introduced into a rotary kiln 20 via a raw material chute 22.

On the other hand, hot air generated in the clinker cooler 18 is sucked into the rotary kiln 20 and the fluidized calciner 11 by a suction force of an induction fan 23. However, an excessive amount of hot air is sucked into the rotary kiln 20, which offers a low draft resistance. Thus, a part of the rotary kiln exhaust gas duct 9 is reduced in cross-sectional area, and the amount of hot air sucked into the fluidized calciner 11 is adjusted by using a damper 24.

In the fluidized calciner, a solid fuel such as coal is generally used as fuel that allows a cement raw material to be calcined. In particular, bituminous coal, which has high combustion quality, is micronized to fine powder for use. However, for effective utilization of limited resources, there has been a demand for the use of various types of fuel such as coal and oil coke, which have low combustion quality.

However, when pulverized coal of coal or coke, which has low combustion quality, is used as fuel, the rate of unburned fuel at an outlet of the fluidized calciner is high, and combustion occurs in the suspension preheater. As a result, the temperature in the preheater is elevated, and attachment is generated in the cyclone or the raw material chute. Thus, disadvantageously, occlusion frequently occurs in the preheater, hindering operation. Furthermore, in the fluidized calciner, the temperature and the concentration of dust are very high, making determination of a combustion state difficult.

Thus, Patent Literature 1 described below proposes a fluidized calciner for a cement raw material including: a tubular furnace body in which the axial direction of the tube is an up-down direction; an air dispersing plate provided substantially horizontally at a bottom portion of the furnace body and an air chamber below the air dispersing plate; a raw material supply chute located above the air dispersing plate and through which a raw material is supplied; a fuel supply nozzle located above the air dispersing plate and through which solid fuel is supplied to a fluidizing bed; a secondary air duct through which secondary air (extracted air) is supplied to above the air dispersing plate, in which the fuel supply nozzle is connected to the furnace body at a descending slope of 20° or more to a horizontal plane so as to be deflected toward a tangential side with respect to a centripetal direction.

This conventional fluidized calciner for a cement raw material calcines a raw material by combusting fuel. However, the connection position of the fuel supply nozzle and the like are based on empirical values, and this technique fails to take into account, for example, the presence or absence of the distribution of a raw material concentration or a gas concentration (particularly $O_2$) in the fluidized calciner. Thus, when pulverized coal of coal or coke, which has low combustion quality, is used as fuel, there are disadvantages that sufficient calcination fails to be achieved and ducts may be occluded to hinder operation.

Furthermore, for refractories such as a furnace body, excessively high combustion quality disadvantageously causes the temperature near a furnace wall to be locally excessively elevated, leading to a high possibility of burnout.

CITATION LIST

Patent Literature

Patent Literature 1: Japanese Patent Laid-Open No. H8-231254

SUMMARY OF INVENTION

Technical Problem

The present invention has been developed in view of these circumstances. An object of the present invention is to provide a fluidized calciner that allows a reduction in the rate of unburned fuel at an outlet of a fluidized calciner to enable sufficient calcination while preventing possible occlusion in a preheater, even when pulverized coal of coal or coke, which has low combustion quality, is used as fuel.

Solution to Problem

To accomplish the object, the invention recited in claim 1 provides a fluidized calciner, comprising a tubular furnace body in which an axial direction is an up-down direction, a pulverized coal blowing line through which fuel is blown into the furnace body, a raw material chute through which a cement raw material is loaded into the furnace body, at least one air introduction pipe through which introduced air is sucked, the pulverized coal blowing line, the raw material chute, and the air introduction pipe being connected to a side portion of the furnace body, and a fluidizing air blowing port disposed at a bottom portion of the furnace body and through which fluidizing air is blown into the furnace body, wherein a blowing port of the pulverized coal blowing line is disposed below a suction port of the air introduction pipe and above the fluidizing air blowing port.

Furthermore, the invention recited in claim 2 provides the invention recited in claim 1, wherein a center of the blowing port of the pulverized coal blowing line is disposed at a position 200 mm away from the fluidizing air blowing port and at a position of 35 to 145° from a center of a loading port of the raw material chute with respect to a circumferential direction of the furnace body.

The invention recited in claim 3 provides the invention recited in claim 1, wherein a center of the blowing port of the pulverized coal blowing line is disposed at a position at least 350 mm away from the fluidizing air blowing port and at a position of 90 to 145° from a center of a loading port of the raw material chute with respect to a circumferential direction of the furnace body.

The invention recited in claim 4 provides the invention recited in claim 1, wherein a center of the blowing port of the pulverized coal blowing line is disposed at a position at least 200 mm away from the fluidizing air blowing port and at a position of 100 to 120° from a center of a loading port of the raw material chute with respect to a circumferential direction of the furnace body.

Advantageous Effects of Invention

According to the invention recited in claims 1 to 4, the blowing port of the pulverized coal blowing line connected to the side portion of the tubular furnace body in which the axial direction is the up-down direction is disposed below the suction port of the air introduction pipe connected to the side portion of the furnace body and above the fluidizing air blowing port disposed at the bottom portion of the furnace body. Thus, a flow of fuel is strongly impacted by a flow of introduced air, allowing the fuel to be blown into an area with a low raw material concentration (which reduces the likelihood of heat absorption as a result of decarbonation) and high $O_2$ concentration. Consequently, combustion can be improved. This allows a reduction in the rate of unburned fuel at an outlet of the furnace body located at an upper portion thereof to keep the temperature in a preheater low, preventing occlusion in the preheater as a result of attachment generated in a cyclone or the raw material chute. Therefore, appropriate operation can be achieved.

According to the invention recited in claim 2, the center of the blowing port of the pulverized coal blowing line is disposed at a position 200 mm away from the fluidizing air blowing port and at a position of 35 to 145° from the center of the loading port of the raw material chute with respect to the circumferential direction of the furnace body. Thus, a mean char reaction rate can be set to at least 60%, and a mean raw material decarbonation rate can be set to at least 50%. Even when pulverized coal of coal or coke, which has low combustion quality, is used as fuel, the rate of unburned fuel at the outlet of furnace body located at the upper portion thereof can be reduced to keep the temperature in the preheater low, preventing possible occlusion. Furthermore, wear on refractories can be reduced.

According to the invention recited in claim 3, the center of the blowing port of the pulverized coal blowing line is disposed at a position at least 350 mm away from the fluidizing air blowing port and at a position of 90 to 145° from the center of the loading port of the raw material chute with respect to the circumferential direction of the furnace body. Thus, the mean char reaction rate can be set to at least 60%, and the mean raw material decarbonation rate can be set to at least 50%. Even when pulverized coal of coal or coke, which has low combustion quality, is used as fuel, the rate of unburned fuel at the outlet of furnace body located at the upper portion thereof can be reduced to keep the temperature in the preheater low, preventing possible occlusion. Furthermore, wear on refractories can be reduced.

According to the invention recited in claim 4, the center of the blowing port of the pulverized coal blowing line is disposed at a position at least 200 mm away from the fluidizing air blowing port and at a position of 100 to 120° from the center of the loading port of the raw material chute with respect to the circumferential direction of the furnace body. Thus, even when pulverized coal of coal or coke, which has low combustion quality, is used as fuel, the rate of unburned fuel at the outlet of furnace body located at the upper portion thereof can be reduced to keep the temperature in the preheater low, preventing possible occlusion. Furthermore, wear on refractories can be reduced.

BRIEF DESCRIPTION OF DRAWINGS

FIG. 3 is a line graph depicting the angle between the blowing port of the pulverized coal blowing line and the loading port of the raw material chute with respect to the circumferential direction and a mean raw material decarbonation rate (%) at a pulverized coal blowing height (h) of the pulverized coal blowing line 3.

DESCRIPTION OF EMBODIMENTS

Figure 1:
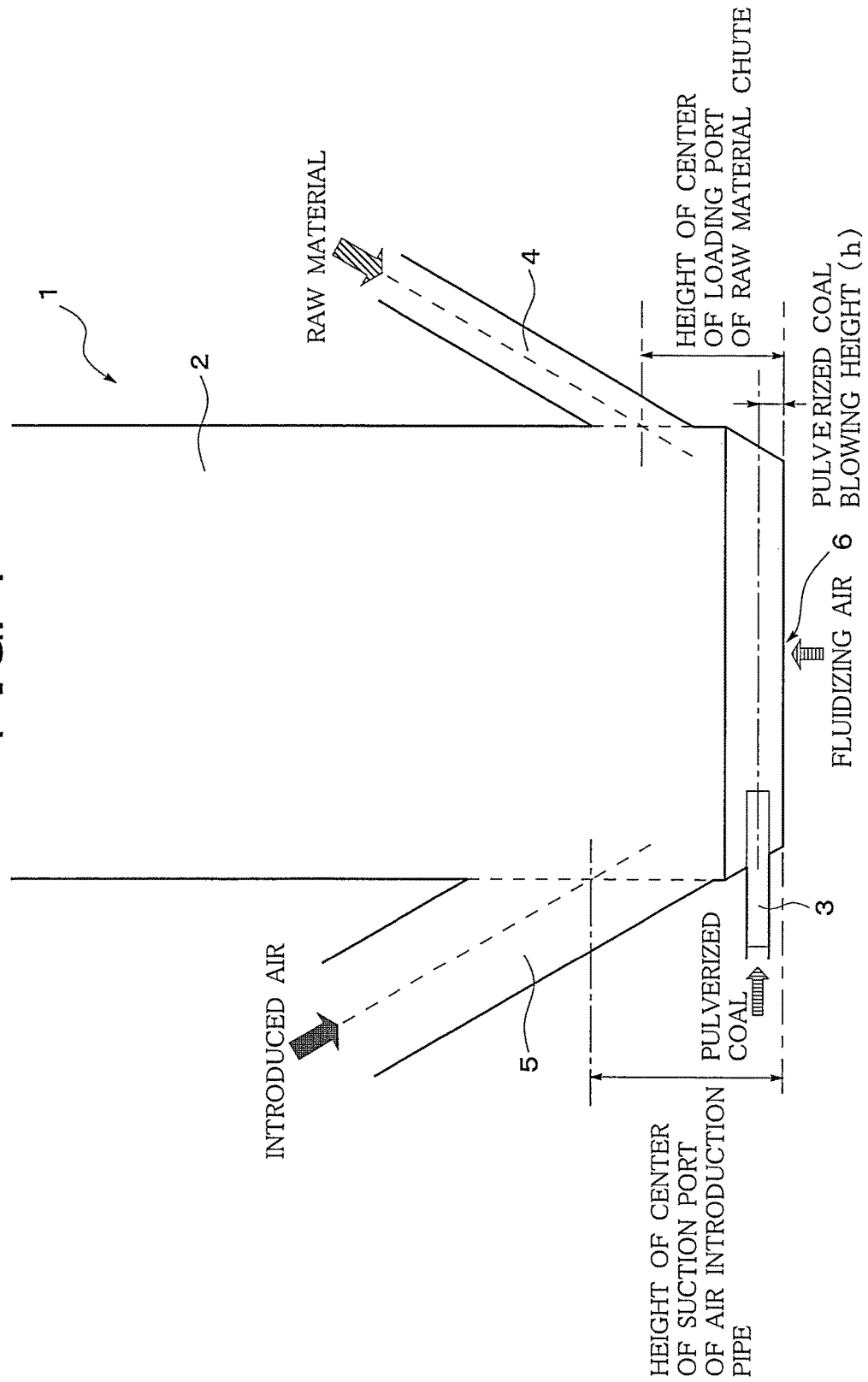
FIG. 1 is a schematic diagram depicting an embodiment of a fluidized calciner according to the present invention.

As depicted in FIG. 1, FIG. 2A, FIG. 2B, and FIG. 2C, Embodiment 1 of a fluidized calciner 1 of the present invention is roughly configured to include a tubular furnace body 2 in which an axial direction is an up-down direction, a pulverized coal blowing line 3 through which pulverized coal as fuel is blown into the furnace body 2, a raw material chute 4 through which a cement raw material is loaded into the furnace body 2, a plurality of (in the drawings, four) air introduction pipe 5 through which introduced air is sucked, the pulverized coal blowing line 3, the raw material chute 4, and the air introduction pipe 5 being connected to a side portion of the furnace body 2, and a fluidizing air blowing port 6 disposed at a bottom portion of the furnace body 2 and through which fluidizing air is blown into the furnace body. The furnace body 2 has an inner diameter of 4 to 6 m.

In this regard, the four air introduction pipe 5 are connected to the side portion of the furnace body 2 at a descending slope so that the centers of suction ports of the air introduction pipe 5 are disposed on the same circumference. Specifically, the angle between the center line of the air introduction pipe 5 and a horizontal plane is set between 55 and 65°. Furthermore, a gas velocity in the air introduction pipe 5 is set to approximately 15 to 18 m/s. Moreover, the center of the suction port of the air introduction pipe 5 is disposed at a height dimension of 1,500 to 2,500 mm above the fluidizing air blowing port 6. In order to evenly supply air to the furnace bottom portion, a plurality of (normally four as depicted in the drawings) air introduction pipes 5 are disposed at approximately equal intervals in a circumferential direction.

The raw material chute 4 is connected to the furnace body 2 between the air introduction pipes 5 at a descending slope, and the angle between the raw material chute 4 and a horizontal plane is empirically determined based on the coefficient of friction and the angle of repose for raw material particles. For normal cement raw materials, the angle between the raw material chute 4 and the horizontal plane is set to approximately 50° to 70°. Furthermore, the diameter of the raw material chute 4 is designed to be suitable for the amount of raw material loaded. Thus, the center of a loading port of the raw material chute 4 is arranged at a height dimension within the range of approximately 1,500 to 3,000 mm above the fluidizing air blowing port 6, though the height dimension depends on the production capacity of the fluidized calciner.

Figure 6:
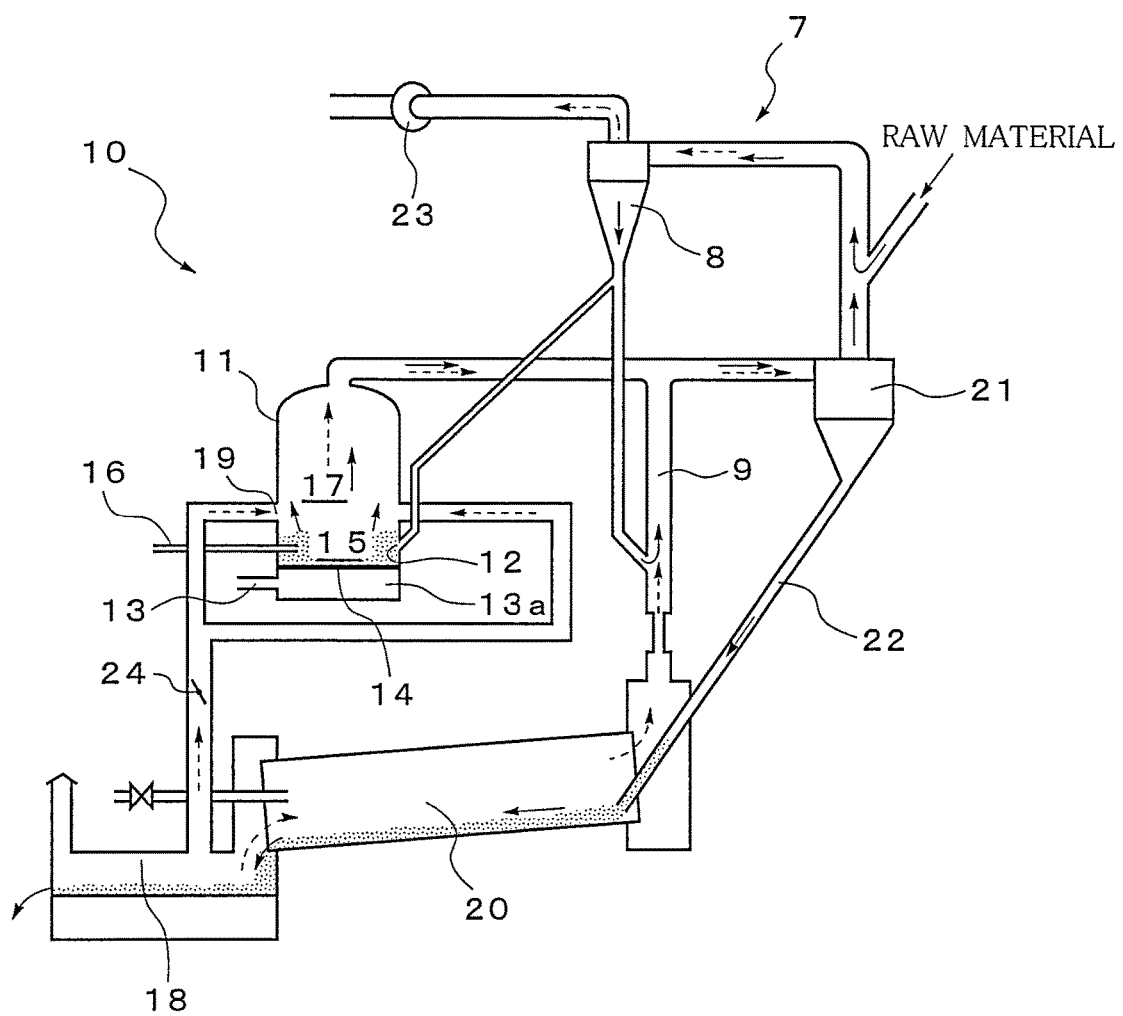
FIG. 6 is a schematic diagram of a conventional cement manufacturing facility.

Furthermore, the fluidizing air blowing port 6 allows high-pressure air to be blown into the furnace body 2 through an air chamber 13a and an air dispersing plate 14, for example, as depicted in the conventional example in FIG. 6. In the present embodiment, the air dispersing plate 14 is disposed parallel to a radial direction of the furnace body 2, as the fluidizing air blowing port 6. In this regard, the blowing velocity of fluidizing air through the fluidizing air blowing port 6 is determined depending on a raw material density and a particle size distribution and is set to 1.0 to 2.0 m/s for normal cement raw materials.

The pulverized coal blowing line 3, through which pulverized coal as fuel, for example, coal or coke, is blown into the furnace body 2, is connected to the furnace body 2 below any one of the four air introduction pipes 5 and above the fluidizing air blowing port 6. Furthermore, the pulverized coal blowing line 3 is connected to the furnace body 2 perpendicularly to a shaft center line thereof so as to extend toward the center of the furnace body 2. Additionally, the center of the blowing port of the pulverized coal blowing line 3 is disposed in alignment with the center of the air introduction pipe 5 with respect to the vertical direction. In addition, a carrying air velocity in the pulverized coal blowing line is an adjustment item for operation. The range of the speed is normally set between 10 and 20 m/s.

The height of the blowing port of the pulverized coal blowing line 3 from the fluidizing air blowing port 6 depends on the position of the raw material chute 4. For example, when the center of the blowing port of the pulverized coal blowing line 3 and the center of the loading port of the raw material chute 4 are disposed at positions within the range of 35 to 145° with respect to the circumferential direction of the furnace body 2, the blowing port is arranged at a height dimension of 200 mm.

Furthermore, when the center of the blowing port of the pulverized coal blowing line 3 and the center of the loading port of the raw material chute 4 are disposed at positions within the range of 90 to 145° with respect to the circumferential direction of the furnace body 2, the blowing port is arranged at a height dimension of at least 350 mm.

The fluidized calciner 1 with the above-described configuration has been configured based on the results of calculations executed by the inventors based on computational fluid dynamics (CFD); through the calculations, the inventors have found that a flow of pulverized coal blown in through the pulverized coal blowing line 3 is impacted by a flow of a raw material loaded through the raw material chute 4 and a flow of gas through the air introduction pipe 5, and found the height of the blowing port of the pulverized coal blowing line 3 from the fluidizing air blowing port 6 and a suitable positional relation between the pulverized coal blowing line 3 and the raw material chute 4 in the circumferential direction of the furnace body 2 as illustrated in Example 1 and Example 2 described below.

The introduced air makes the same impact on a flow of pulverized coal regardless of whether the bleed air is blown or sucked through the air introduction pipe 5.

The calculations in accordance with the computational fluid dynamics involve quantifying the actual shape of the fluidized calciner and operational conditions therefor and numerically calculating gas flow, particle migration, chemical reaction, and heat transfer using a computer in which an analysis program is installed, to make determination of the state of combustion and calcination in the fluidized calciner using computer graphics, the determination being otherwise difficult to make based on actual measurements.

Methods and models for the calculations in accordance with the computational fluid dynamics are as follows:
 (1) Numerical fluid dynamics computation software (R-flow Corporation Ltd.)
 (2) Turbulence model: k-ε Model
 (3) Fluid: incompressible ideal gas
 (4) Pressure-speed coupling: SIMPLE
 (5) Discretization scheme: Finite Volume Method
 (6) Momentum: Second Order Upwind
 (7) Turbulent kinetic energy: First Order Upwind
 (8) Turbulent dissipation rate: First Order Upwind
 (9) Energy: Second Order Upwind
 (10) Particle analysis: Discrete Element Method
 (11) Particle fluid interaction: Two Way Coupling

(12) Pulverized coal combustion: $H_2+O_2$—$H_2O$, $CH_4+O_2$—$H_2O+CO_2$, $CO+O_2$—$CO_2$, $C+O_2$—$CO_2$

(13) Raw material decarbonation model: $CaCO_3$—$CaO+CO_2$, unreacted core model Of these methods and models, (2) to (13) are all general-purpose models widely used by those skilled in the art; (2) to (11) are used to perform numerical fluid analysis on a flow of gas or the like, (12) is used to perform combustion analysis, and (13) is used to analyze decarbonation of limestone.

Figure 4:
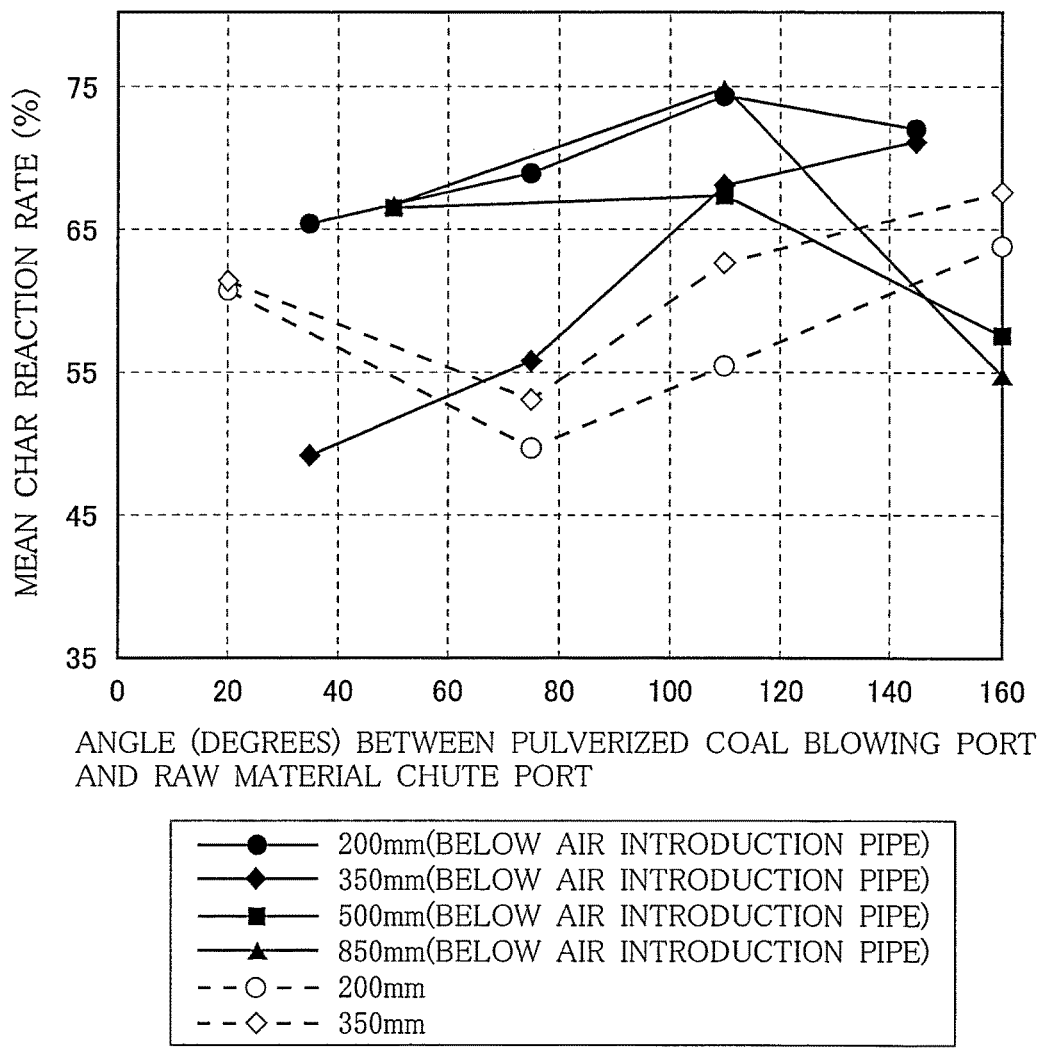
FIG. 4 is a line graph depicting the angle between the blowing port of the pulverized coal blowing line and the loading port of the raw material chute with respect to the circumferential direction and the mean char reaction rate (%) at a pulverized coal blowing height (h) of the pulverized coal blowing line 3.

Evaluation using the calculations in accordance with the computational fluid dynamics is performed by calculating the mean raw material decarbonation rate (%) with respect to the angles of the blowing port of the pulverized coal blowing line 3 and the loading port of the raw material chute 4 for a plurality of cases for the position of the pulverized coal blowing line 3 and a pulverized coal blowing height (h) of the pulverized coal blowing line 3, as depicted in FIG. 3, and similarly calculating the mean char reaction rate (%) with respect to the angle between the blowing port of the pulverized coal blowing line 3 and the loading port of the raw material chute 4 for a plurality of cases for the position of the pulverized coal blowing line 3 and the pulverized coal blowing height (h) of the pulverized coal blowing line 3, as depicted in FIG. 4.

Furthermore, the mean raw material decarbonation rate (%) has been obtained by performing weighted averaging on the decarbonation rate for each raw material particle at the outlet of the calciner in accordance with the weight of the particle that has not been calcined. The mean char reaction rate (%) has been obtained by performing weighted averaging on the char reaction rate for each pulverized coal particle at the outlet of the calciner in accordance with the weight of char that has not reacted. Moreover, the mean raw material decarbonation rate (%) of at least 50% is evaluated to correspond to high relevant performance. A mean char reaction rate (%) of at least 60% is evaluated to correspond to high relevant performance.

Moreover, the graph of the mean raw material decarbonation rate (%) in FIG. 3 and the graph of the mean char reaction rate (%) in FIG. 4 are related to Example 1 where each pulverized coal blowing line 3 is connected to the furnace body below the corresponding air introduction pipe 5 and where the center of the blowing port of the pulverized coal blowing line 3 is positioned at a height dimension of 200 mm from the fluidizing air blowing port 6, Example 2 where the center of the blowing port of the pulverized coal blowing line 3 is positioned at a height dimension of at least 350 mm (350 mm, 500 mm, and 850 mm) from the fluidizing air blowing port, and Comparative Example where each pulverized coal blowing line 3 is connected to the furnace body at a position other than the position below the corresponding air introduction pipe 5 and where the center of the blowing port of the pulverized coal blowing line 3 is positioned at height dimensions of 200 mm and 350 mm from the fluidizing air blowing port 6.

The composition of coal used in Example 1, Example 2, and Comparative Example illustrated below is as follows.
  Name: Bituminous coal
  Amount of heat generation (Kcal/Kg): 6700
  Volatile content (%): 34.3
  Fixed carbon (%): 49.4
  Water content (%): 6.8
  Ash content (%): 9.5

When the type of pulverized coal was changed, not only the above-described industrial analytical values were changed but also the amount of pulverized coal fed was adjusted so as to maintain a constant total amount of heat generated by the pulverized coal loaded into the calciner.

Example 1

Figure 2A:
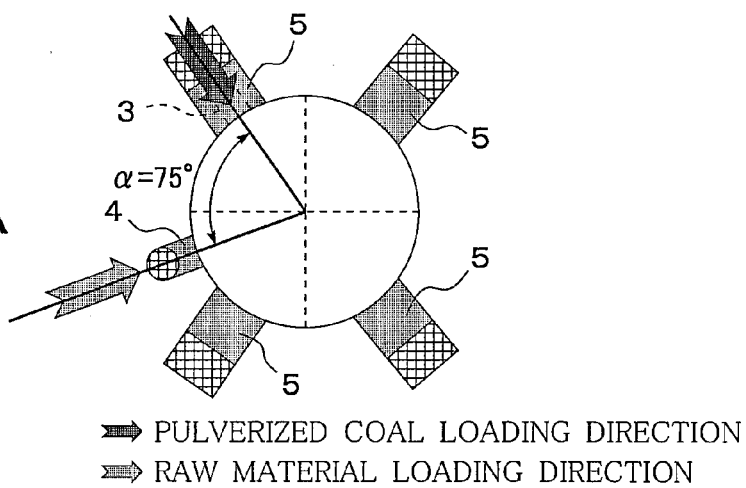
FIG. 2A is a schematic diagram depicting a positional relation between a blowing port of a pulverized coal blowing line and a loading port of a raw material chute in a fluidized calciner of the present invention, in which the blowing port of the pulverized coal blowing line is disposed at a position below a suction port of an air introduction pipe, and the loading port of the raw material chute is disposed at a position of 75° with respect to a circumferential direction.

First, for the calculations in accordance with the computational fluid dynamics in Example 1, the raw material chute 4 was arranged at a position (in the drawings, 75° closer to the pulverized coal blowing line 3 connected to the furnace body below the air introduction pipe 5, based on the shape of the actual furnace, as depicted in FIG. 1 and FIG. 2A. At this time, the center of the loading port of the raw material chute 4 was arranged at a height dimension of 2,000 mm above the fluidizing air blowing port 6 and in alignment with the center of the suction port of the air introduction pipe 5 arranged in alignment with the fluidizing air blowing port 6 in the circumferential direction.

Furthermore, the calculations in accordance with the computational fluid dynamics were executed for the arrangement where the center of the blowing port of the pulverized coal blowing line 3 arranged below the air introduction pipe 5 was arranged at a height dimension of 200 mm from the fluidizing air blowing port 6.

The angle between the blowing port of the pulverized coal blowing line 3 and the loading port of the raw material chute 4 is as follows.

200 mm: 35°, 75°, 110°, 145°

Moreover, for operational conditions for the actual furnace such as the amount of cement raw material loaded, flow velocity, and temperature, the following data was used.
  Furnace body 2
  Furnace inner diameter=4 m
  Furnace length=25 m
  Pulverized coal blowing line 3
  Amount of pulverized coal fed=7.4 t/h
  Carrying air flow velocity=11 m/s
  Temperature=50° C.
  Raw material chute 4
  Cement raw material: 200 t/h
  Temperature=740° C.
  Carrying air flow velocity=0.5 m/s
  Air introduction pipe 5 (arranged at four positions in the circumferential direction)
  Introduced air
  Temperature=880° C.
  Flow velocity=15.8 m/s
  Fluidizing air blowing port
  Fluidizing air
  Temperature=800° C.
  Flow velocity=1.64 m/s Then, the mean raw material decarbonation rate (%) and the mean char reaction rate (%) were computationally determined for each angle between the blowing port of the pulverized coal blowing line 3 and the loading port of the raw material chute 4. The results are as depicted in FIG. 3 and FIG. 4.

For Example 1 where the pulverized coal blowing line 3 was arranged below the air introduction pipe 5 and at a height dimension of 200 mm from the fluidizing air blowing port 6, it has been found that the mean raw material decarbonation rate (%) in FIG. 3 and the mean char reaction rate (%) in FIG. 4 are set to at least 50% and at least 60%, respectively, by arranging the pulverized coal blowing line 3 and the raw material chute 4 such that the angle between the blowing port of the pulverized coal blowing line 3 and the loading port of the raw material chute 4 is within the range of 35 to 145°.

Example 2

Figure 2B:
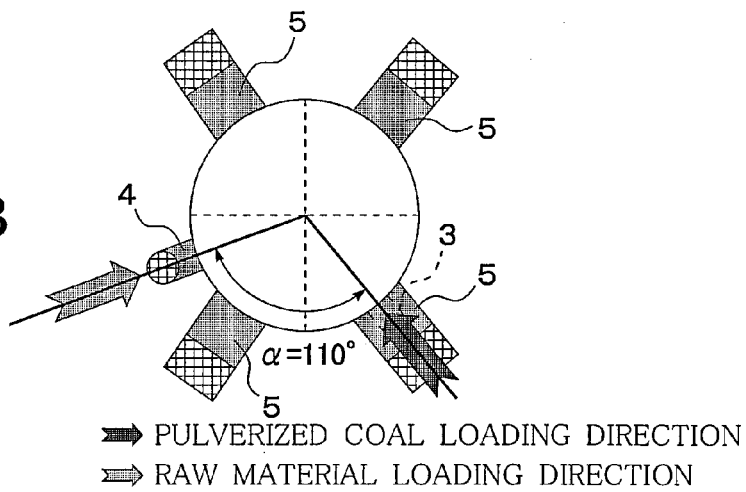
FIG. 2B is a schematic diagram depicting the positional relation between the blowing port of the pulverized coal blowing line and the loading port of the raw material chute in the fluidized calciner of the present invention, in which the blowing port of the pulverized coal blowing line is disposed at a position below the suction port of the air introduction pipe, and the loading port of the raw material chute is disposed at a position of 110° with respect to the circumferential direction.

Then, in Example 2, like in Example 1, the raw material chute 4 was arranged at a position (in the drawings, 110°) further from the pulverized coal blowing line 3 connected to the furnace body below the air introduction pipe 5, based on the shape of the actual furnace, as depicted in FIG. 1 and FIG. 2B. At this time, the center of the loading port of the raw material chute 4 was arranged at a height dimension of 2,000 mm above the fluidizing air blowing port 6 and in alignment with the center of the blowing port of the air introduction pipe 5 arranged in alignment with the fluidizing air blowing port 6 in the circumferential direction.

Furthermore, the calculations in accordance with the computational fluid dynamics were executed for the arrangement where the center of the blowing port of the pulverized coal blowing line 3 arranged below the air introduction pipe 5 was arranged at least 350 mm above the fluidizing air blowing port 6, in Example 2, at three height dimensions of 350 mm, 500 mm, and 850 mm.

The angle between the blowing port of the pulverized coal blowing line 3 and the loading port of the raw material chute 4 for each height of the blowing port of the pulverized coal blowing line 3 is as follows.

350 mm: 35°, 75°, 110°, 145°
500 mm: 50°, 110°, 160°
850 mm: 50°, 110°, 160°

Moreover, for the operational conditions for the actual furnace such as the amount of cement raw material loaded, the flow velocity, and the temperature, like in Example 1, the following data was used for example.

Furnace body 2
Furnace inner diameter=4 m
Furnace length=25 m
Pulverized coal blowing line 3
Amount of pulverized coal fed=7.4 t/h
Carrying air flow velocity=11 m/s
Temperature=50° C.
Raw material chute 4
Cement raw material: 200 t/h
Temperature=740° C.
Carrying air flow velocity=0.5 m/s
Air introduction pipe 5 (arranged at four positions in the circumferential direction)
Introduced air
Temperature=880° C.
Flow velocity=15.8 m/s
Fluidizing air blowing port
Fluidizing air
Temperature=800° C.
Flow velocity=1.64 m/s Then, for each height dimension of the blowing port of the pulverized coal blowing line 3, the mean raw material decarbonation rate (%) and the mean char reaction rate (%) were computationally determined for each angle between the blowing port of the pulverized coal blowing line 3 and the loading port of the raw material chute 4. The results are as depicted in FIG. 3 and FIG. 4.

For Example 2 where the pulverized coal blowing line 3 was arranged below the air introduction pipe 5 and at a height dimension of at least 350 mm from the fluidizing air blowing port 6, it has been found that the mean raw material decarbonation rate (%) in FIG. 3 and the mean char reaction rate (%) in FIG. 4 are set to at least 50% and at least 60%, respectively, by arranging the pulverized coal blowing line 3 and the raw material chute 4 such that the angle between the blowing port of the pulverized coal blowing line 3 and the loading port of the raw material chute 4 is within the range of 90 to 145°.

It has been found that, when the pulverized coal blowing line 3 is arranged below the air introduction pipe 5 and at a height dimension of at least 500 mm from the fluidizing air blowing port 6, the mean raw material decarbonation rate (%) is high and at least 50% but the gas temperature near the furnace wall in the furnace body 2 is high at a height position of 5 to 20 m when the pulverized coal blowing line 3 is attached closer to the raw material chute 4 below the air introduction pipe 5. This may cause burnout of bricks in the furnace body 2.

Comparative Example

Figure 2C:
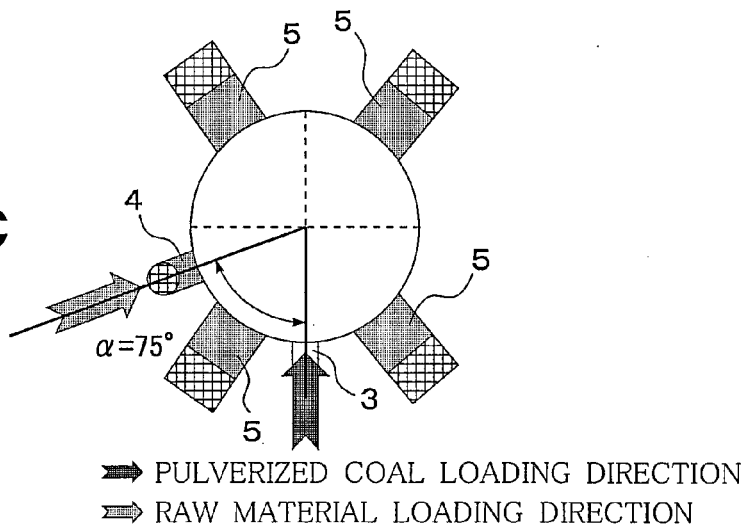
FIG. 2C is a schematic diagram depicting the positional relation between the blowing port of the pulverized coal blowing line and the loading port of the raw material chute in the fluidized calciner of the present invention, in which the blowing port of the pulverized coal blowing line is disposed at a position other than the position below the suction port of the air introduction piper, and the loading port of the raw material chute is disposed at a position of 75° with respect to the circumferential direction.

Moreover, in Comparative Example, like in Examples 1 and 2, the raw material chute 4 was arranged at a position (in the drawings, 75°) closer to the pulverized coal blowing line 3 connected to the furnace body at a position other than the position below the air introduction pipe 5, based on the shape of the actual furnace, as depicted in FIG. 2C. At this time, the center of the loading port of the raw material chute 4 was arranged at a height dimension of 2,000 mm above the fluidizing air blowing port 6 and in alignment with the center of the blowing port of the air introduction pipe 5 arranged in alignment with the fluidizing air blowing port 6 in the circumferential direction.

Furthermore, the calculations in accordance with the computational fluid dynamics were executed for the arrangement where the center of the blowing port of the pulverized coal blowing line 3 arranged at the position other than the position below the air introduction pipe 5 was arranged at each of the two height dimensions of 200 mm and 350 mm from the fluidizing air blowing port 6.

The angle between the blowing port of the pulverized coal blowing line 3 and the loading port of the raw material chute 4 for each height of the blowing port of the pulverized coal blowing line 3 is as follows.

200 mm: 20°, 75°, 110°, 160°
350 mm: 20°, 75°, 110°, 160°

Moreover, for the operational conditions for the actual furnace such as the amount of cement raw material loaded, the flow velocity, and the temperature, like in Examples 1 and 2, the following data was used for example.

Furnace body 2
Furnace inner diameter=4 m
Furnace length=25 m
Pulverized coal blowing line 3
Amount of pulverized coal fed=7.4 t/h
Carrying air flow velocity=11 m/s
Temperature=50° C.
Raw material chute 4
Cement raw material: 200 t/h
Temperature=740° C.
Carrying air flow velocity=0.5 m/s
Air introduction pipe 5 (arranged at four positions in the circumferential direction)
Introduced air
Temperature=880° C.
Flow velocity=15.8 m/s
Fluidizing air blowing port Fluidizing air Temperature=800° C.

Flow velocity=1.64 m/s

Then, for each height dimension of the blowing port of the pulverized coal blowing line 3, the mean raw material decarbonation rate (%) and the mean char reaction rate (%) were computationally determined for each angle between the blowing port of the pulverized coal blowing line 3 and the loading port of the raw material chute 4. The results are as depicted by dashed lines in FIG. 3 and FIG. 4.

Thus, in Comparative Example where the pulverized coal blowing line 3 was arranged at the position other than the position below the air introduction pipe 5 and at height dimensions of 200 mm and 350 mm from the fluidizing air blowing port, for the angle between the blowing port of the pulverized coal blowing line 3 and the loading port of the raw material chute 4, an appropriate angle failed to be obtained which contributed to high performance in which the mean raw material decarbonation rate (%) in FIG. 3 is at least 50% and in which the mean char reaction rate in FIG. 4 is at least 60%.

Figure 5:
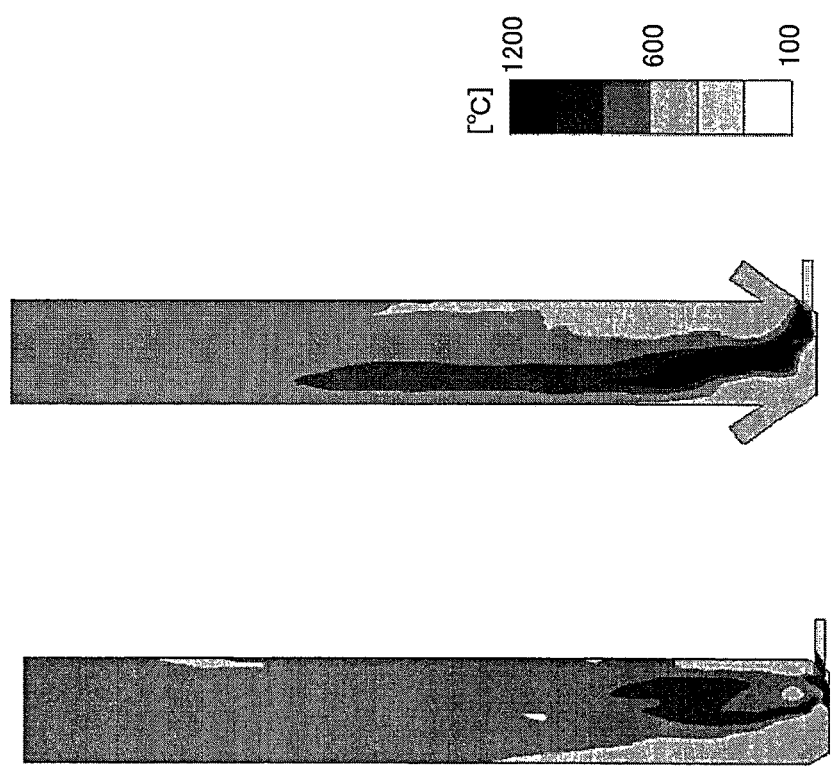
FIG. 5 is a computer graphic depicting results for the embodiment of the present invention and a variation in temperature distribution depending on a variation in the position of the blowing port of the pulverized coal blowing line.

The results of the calculations in accordance with the computational fluid dynamics first indicate that, when the blowing port of the pulverized coal blowing line 3 is arranged below the air introduction pipe 5, the gas temperature at the bottom portion of the furnace body 2 is higher than when the blowing port of the pulverized coal blowing line 3 is not arranged below the air introduction pipe 5, as depicted in FIG. 5. This indicates that, when the blowing port of the pulverized coal blowing line 3 is arranged below the air introduction pipe 5, the pulverized coal is ignited quickly, leading to improved combustion quality.

Furthermore, as depicted in FIG. 3 and FIG. 4, when the pulverized coal blowing line 3 is attached to the furnace body at a position far from the raw material chute 4 below the suction port of the air introduction pipe 5, a supply position for pulverized coal can be optimized by arranging the pulverized coal blowing line 3 at a height of at least 200 mm from the fluidizing air blowing port 6.

Moreover, when the pulverized coal blowing line 3 is attached at a position close to the raw material chute 4 below the suction port of the air introduction pipe 5, at a height of 350 mm from the fluidizing air blowing port 6, the flow of pulverized coal is strongly impacted by the flow of the raw material and is displaced from an area with a low raw material concentration and a high $O_2$ concentration, leading to a low char reaction rate. Thus, it has been found that, when the pulverized coal blowing line 3 was arranged at a height of 200 mm from the fluidizing air blowing port 6, the impact of the flow of the raw material was reduced to allow the pulverized coal to be blown into the desired area, enabling the supply position for pulverized coal to be optimized. It has also been found that, when the pulverized coal blowing line 3 is arranged at a height of at least 500 mm from the fluidizing air blowing port 6, the flow of pulverized coal can be blown into the desired area but excessive combustion occurs locally, with the result that the temperature near the furnace wall becomes excessively high to increase the possibility of burnout.

Furthermore, it has been found that, when the pulverized coal blowing line 3 is attached to a position other than the position below the air introduction pipe 5, the flow of pulverized coal is impacted only weakly by the flow of introduced air but strongly by the flow of the raw material, precluding the pulverized coal from being blown into the desired area, with the result that combustion is deteriorated regardless of from where the pulverized coal is blown in.

As seen in the results in Examples 1 and 2, in the fluidized calciner disclosed in the above-described embodiment, the blowing port of the pulverized coal blowing line 3 connected to the side portion of the tubular furnace body 2 in which the axial direction is the up-down direction is arranged below the suction port of the air introduction pipe 5 connected to the side portion of the furnace body 2 and above the fluidizing air blowing port 6 disposed at the bottom portion of the furnace body 2. Thus, the flow of fuel is strongly impacted by the flow of introduced air, allowing the fuel to be blown into the area with a low raw material concentration (which reduces the likelihood of heat absorption as a result of decarbonation) and a high $O_2$ concentration. Consequently, combustion can be improved. This allows a reduction in the rate of unburned fuel at the outlet of the furnace body 2 located at the upper portion thereof to keep the temperature in a preheater low, preventing occlusion in the preheater as a result of attachment generated in a cyclone or the raw material chute. Therefore, appropriate operation can be achieved.

Furthermore, the center of the blowing port of the pulverized coal blowing line 3 is disposed at a position 200 mm away from the fluidizing air blowing port 6 and at a position of 35 to 145° from the center of the loading port of the raw material chute 4 with respect to the circumferential direction of the furnace body 2. Thus, a mean char reaction rate can be set to at least 60%, and a mean raw material decarbonation rate can be set to at least 50%. Even when pulverized coal of coal or coke, which has low combustion quality, is used as fuel, the rate of unburned fuel at the outlet of furnace body 2 located at the upper portion thereof can be reduced to keep the temperature in the preheater low, preventing possible occlusion due to the generation of attachment in the cyclone or the raw material chute. Furthermore, wear on refractories can be reduced.

When the center of the blowing port of the pulverized coal blowing line 3 is disposed at a position at least 350 mm away from the fluidizing air blowing port 6 and at a position of 90 to 145° from the center of the loading port of the raw material chute 4 with respect to the circumferential direction of the furnace body 2, the mean char reaction rate can be set to at least 60%, and the mean raw material decarbonation rate can be set to at least 50%. Even when pulverized coal of coal or coke, which has low combustion quality, is used as fuel, the rate of unburned fuel at the outlet of furnace body located at the upper portion thereof can be reduced to keep the temperature in the preheater low, preventing possible occlusion due to the generation of attachment in the cyclone or the raw material chute. Furthermore, wear on refractories can be reduced.

Moreover, when the center of the blowing port of the pulverized coal blowing line 3 is disposed at a position at least 200 mm away from the fluidizing air blowing port 6 and at a position of 100 to 120° from the center of the loading port of the raw material chute 4 with respect to the circumferential direction of the furnace body 2. Thus, even when pulverized coal of coal or coke, which has low combustion quality, is used as fuel, the rate of unburned fuel at the outlet of furnace body 2 located at the upper portion thereof can be reduced to keep the temperature in the preheater low, preventing possible occlusion due to the generation of attachment in the cyclone or the raw material chute. Furthermore, wear on refractories can be reduced.

INDUSTRIAL APPLICABILITY

The present invention can be utilized for a tubular fluidized calciner in which the axial direction is the up-down direction.

REFERENCE SIGNS LIST

1 Fluidized calciner
2 Furnace body
3 Pulverized coal blowing line
4 Raw material chute
5 Air introduction pipe
6 Fluidizing air blowing port

The invention claimed is:

1. A fluidized calciner comprising a tubular furnace body in which an axial direction thereof is an up-down direction, a pulverized coal blowing line through which fuel is blown into the furnace body, a raw material chute through which a cement raw material is loaded into the furnace body, at least one air introduction pipe comprising an air inlet through which air enters the air introduction pipe and a suction port through which air is introduced into the calciner, the pulverized coal blowing line, the raw material chute, and the air introduction pipe being connected to a side portion of the furnace body, and a fluidizing air blowing port disposed at a bottom portion of the furnace body and through which fluidizing air is blown into the furnace body, wherein a blowing port of the pulverized coal blowing line is connected to the furnace body perpendicular to a shaft center line thereof so as to extend toward the center of the furnace body and the center of the blowing port of the pulverized coal blowing line is disposed in alignment with the center of the air introduction pipe with respect to the vertical direction, and the blowing port of the pulverized coal blowing line is disposed below the suction port of the air introduction pipe, and wherein the center of the blowing port of the pulverized coal blowing line is disposed at a position 200 mm away from the fluidizing air blowing port and at a position of 35 to 145° from a center of a loading port of the raw material chute with respect to a circumferential direction of the furnace body.

2. A fluidized calciner comprising a tubular furnace body in which an axial direction thereof is an up-down direction, a pulverized coal blowing line through which fuel is blown into the furnace body, a raw material chute through which a cement raw material is loaded into the furnace body, at least one air introduction pipe comprising an air inlet through which air enters the air introduction pipe and a suction port through which air is introduced into the calciner, the pulverized coal blowing line, the raw material chute, and the air introduction pipe being connected to a side portion of the furnace body, and a fluidizing air blowing port disposed at a bottom portion of the furnace body and through which fluidizing air is blown into the furnace body, wherein a blowing port of the pulverized coal blowing line is connected to the furnace body perpendicular to a shaft center line thereof so as to extend toward the center of the furnace body and the center of the blowing port of the pulverized coal blowing line is disposed in alignment with the center of the air introduction pipe with respect to the vertical direction, and the blowing port of the pulverized coal blowing line is disposed below the suction port of the air introduction pipe, and wherein the center of the blowing port of the pulverized coal blowing line is disposed at a position at least 350 mm away from the fluidizing air blowing port and at a position of 90 to 145° from a center of a loading port of the raw material chute with respect to a circumferential direction of the furnace body.

3. A fluidized calciner comprising a tubular furnace body in which an axial direction thereof is an up-down direction, a pulverized coal blowing line through which fuel is blown into the furnace body, a raw material chute through which a cement raw material is loaded into the furnace body, at least one air introduction pipe comprising an air inlet through which air enters the air introduction pipe and a suction port through which air is introduced into the calciner, the pulverized coal blowing line, the raw material chute, and the air introduction pipe being connected to a side portion of the furnace body, and a fluidizing air blowing port disposed at a bottom portion of the furnace body and through which fluidizing air is blown into the furnace body, wherein a blowing port of the pulverized coal blowing line is connected to the furnace body perpendicular to a shaft center line thereof so as to extend toward the center of the furnace body and the center of the blowing port of the pulverized coal blowing line is disposed in alignment with the center of the air introduction pipe with respect to the vertical direction, and the blowing port of the pulverized coal blowing line is disposed below the suction port of the air introduction pipe, and wherein the center of the blowing port of the pulverized coal blowing line is disposed at a position at least 200 mm away from the fluidizing air blowing port and at a position of 100 to 120° from a center of a loading port of the raw material chute with respect to a circumferential direction of the furnace body.

* * * * *